United States Patent
Cohen et al.

(10) Patent No.: US 6,606,645 B1
(45) Date of Patent: Aug. 12, 2003

(54) METHOD FOR PRECONNECTING TO A SERVER ON A NETWORK

(75) Inventors: Edith Cohen, Berkeley Heights, NJ (US); Haim Kaplan, Morris Plains, NJ (US); Uri Zwick, Tel Aviv (IL)

(73) Assignee: AT&T Corp., New York, NY (US)

( * ) Notice: Subject to any disclaimer, the term of this patent is extended or adjusted under 35 U.S.C. 154(b) by 141 days.

(21) Appl. No.: 10/021,459

(22) Filed: Oct. 29, 2001

Related U.S. Application Data

(63) Continuation of application No. 09/181,727, filed on Oct. 29, 1998, now abandoned.

(51) Int. Cl.$^7$ .............................................. G06F 13/00
(52) U.S. Cl. .................................................... 709/203
(58) Field of Search ................................. 709/200, 203, 709/217, 218, 223

(56) References Cited

U.S. PATENT DOCUMENTS 6,067,565 A * 5/2000 Horvitz ...................... 709/218

* cited by examiner

*Primary Examiner*—Robert B. Harrell

(57) ABSTRACT

A method is disclosed for reducing user-perceived latency due to the time required to establish a connection to a server in a network. In accordance with the present invention, an open connection is established to a set of servers, there being some probability the user will contact one of the servers in the near future. This is referred to as preconnecting or prefetching the connection. In the context of a Web client-server network, a list of likely servers can be deduced from links on a current Web page a user is looking at or from a more sophisticated analysis of the user's browsing habits. When the user requests a resource from one of the identified servers, the network connection has already been established, thereby reducing latency and improving service quality, especially for higher bandwidth clients for whom the delay is most noticeable. In contrast to conventional document prefetching, preconnecting does not hog network bandwidth or consume cache space, and hence can be used with much less scrutiny. Moreover, the technique can be implemented in Web browsers without protocol modifications or changes to Web server code.

20 Claims, 3 Drawing Sheets

(PRIOR ART)

(PRIOR ART)

METHOD FOR PRECONNECTING TO A SERVER ON A NETWORK

RELATED APPLICATIONS

This application is a continuation of Ser. No. 09/181,727, filed Oct. 29, 1998, now abandoned.

FIELD OF THE INVENTION

The present invention relates to communication in a client-server computer network and, in particular, to techniques for reducing user-perceived latency when a user requests a resource from a server.

BACKGROUND OF THE INVENTION

Communications between computers in a network environment are handled by a common protocol. For example, with reference to FIG. 1, World Wide Web clients 110 and servers 120 on the Internet communicate utilizing the hypertext transfer protocol or HTTP. Underlying HTTP, communications are established and requests and responses are sent using connections based on the transmission control protocol or TCP. TCP is part of the TCP/IP protocol suite, which allows computers of different sizes running completely different operating systems to communicate with each other. TCP is a connection-oriented protocol: in other words, a connection must be established between two computers before data can be transferred. TCP uses a three-way handshake in order to initiate a connection: the client 110 sends a segment of data 201 requesting a connection to the server; the server 120 responds to the request 202; and the client must acknowledge the server's response 203 before a connection is established, as set forth in FIG. 2. Likewise, a formal procedure is required to terminate an open connection between the client and the server.

It is important to reduce delays from the time a resource is requested in a computer network to the time it is received. Such delays are referred to as user-perceived latency. For example, when a user issues an HTTP request over the Internet, there is a delay before the user receives the requested resource (e.g. a Web page). This delay has several components: (1) the round-trip time (RTT) required to establish the TCP connection; (2) the TCP "slow start"; and (3) the transmission time. The TCP "slow start" refers to the aspect of TCP whereby data is initially transferred at a low transmission rate and the transmission rate is doubled until bandwidth limits are reached (i.e. packets are lost or the connection speed saturated) and the transmission rate stabilizes. The connection-setup RTT, the TCP slow start period, and the transmission time all introduce a latency which the user experiences as a delay before receiving the requested resource. When the TCP connection is closed after receiving each requested resource, the above delay adds up and further reduces service quality.

Several techniques have been devised to address user-perceived latency. For example, two techniques form an integral part of the new HTTP 1.1 protocol (the techniques can also be deployed with the older HTTP 1.0 protocol): (1) persistent connections between the client and server and (2) pipelining of TCP connections. "Persistent" connection refers to the process of keeping a connection open for subsequent imminent requests (this is optional in HTTP 1.0 and the default in HTTP 1.1). Although persistent connections and pipelining can reduce latencies that accrue from the establishment of the TCP connection and slow start on subsequent consecutive requests to a server, the user will still experience these latencies on the first request issued to the server.

Another suggested solution has been the prefetching of documents. A prediction is made of what resources the user is likely to request and the resources are prefetched before the user actually initiates a request for the resources. The main down side to prefetching resources is the bandwidth requirement. Excessive prefetching may overload the user's link to the Internet which is often low bandwidth, e.g. a telephone line. It also may overload the network and reduce the overall service quality.

Another technique has been the caching of documents at the user's Web browser or at a cache shared by many users (i.e. proxy caching), a technique obviously limited by the size and content of the cache. Moreover, caching does not address the connection-setup RTT delay since a validation of the contents of the cache is still required. Another proposed technique has been reducing the TCP slow start by using a higher initial transmission rate. Although such an aggressive implementation of TCP can save on slow start induced delay, it can also cause user data to be lost by saturated routes.

SUMMARY OF THE INVENTION

The present invention relates to a novel technique for reducing user-perceived latency due to the time required to establish a connection to a server in a network. In accordance with the present invention, an open connection is established to a set of servers, there being some probability that the user will contact one of the servers in the near future. This is referred to as preconnecting or prefetching the connection. For example, in the context of a Web client-server network, a list of likely servers can be deduced from links on a current Web page a user is looking at or from a more sophisticated analysis of the user's browsing habits. When the user requests a resource from one of the identified servers, the network connection has already been established, thereby reducing latency and improving service quality, especially for higher bandwidth clients for whom the delay is most noticeable. In contrast to conventional document prefetching, preconnecting does not hog network bandwidth or consume cache space, and hence can be used with much less scrutiny. Moreover, the technique can be implemented in Web browsers without protocol modifications or changes to Web server code.

DETAILED DESCRIPTION

In accordance with the invention, a connection is established to a set of servers with a probability of being accessed by a user in the near future (for example, up to 30 seconds to 2 minutes). The inventors refer to this as preconnecting or prefetching the connection. Preconnecting, in the Web client-server context for example, addresses the delay due to the RTT of establishing a TCP connection. This delay affects both low and high bandwidth clients, although eliminating this delay would be particularly advantageous for higher bandwidth clients.

Figure 1:
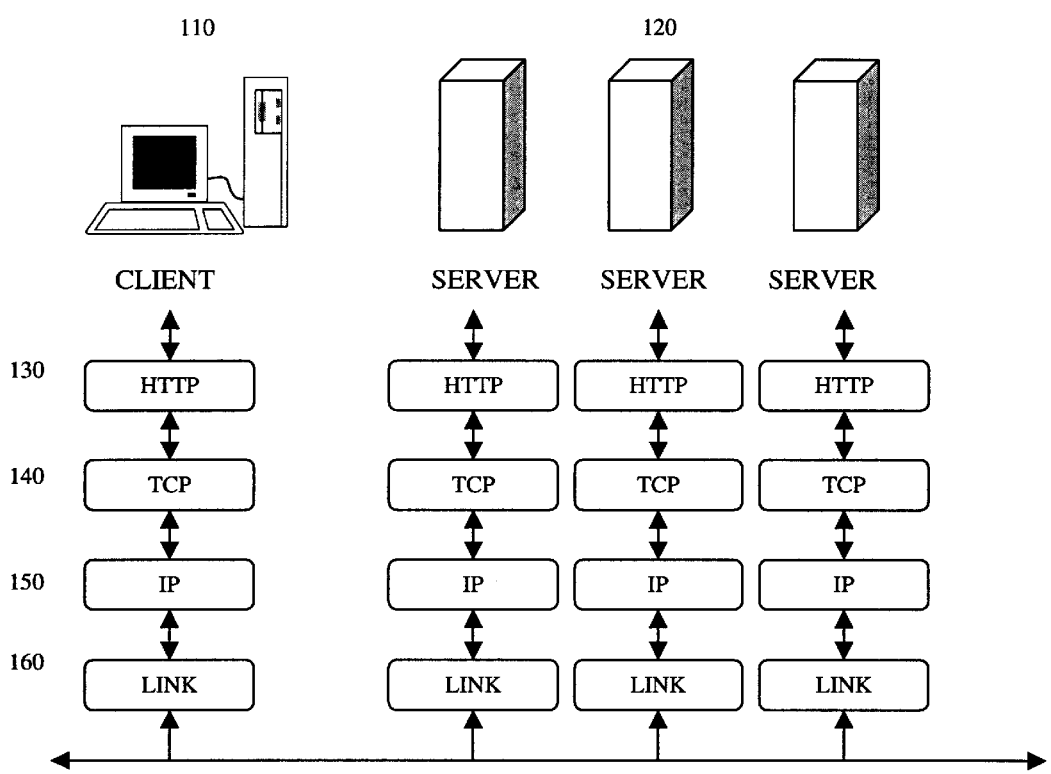
FIG. 1 is a schematic diagram illustrating a typical client computer with connections to multiple servers.
Figure 2:
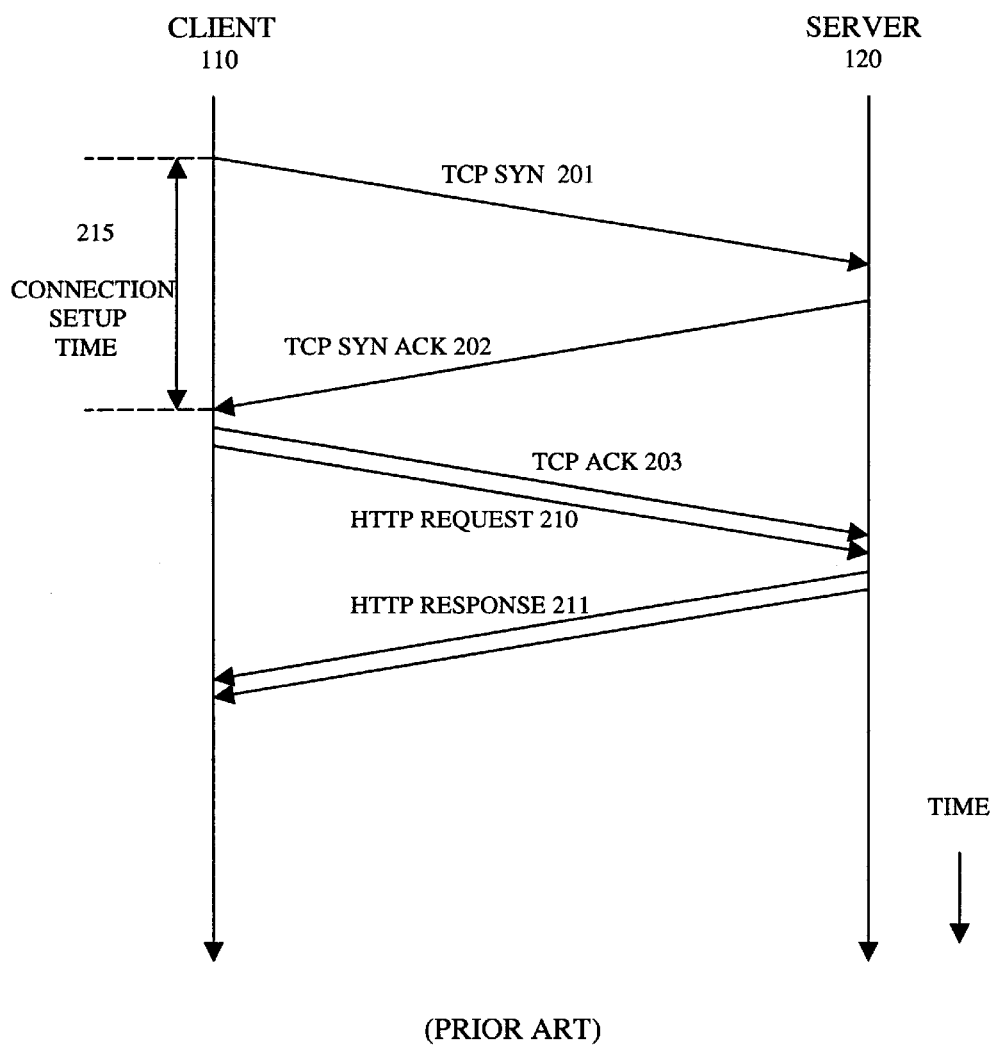
FIG. 2 is an illustration of the TCP connection process.
Figure 3:
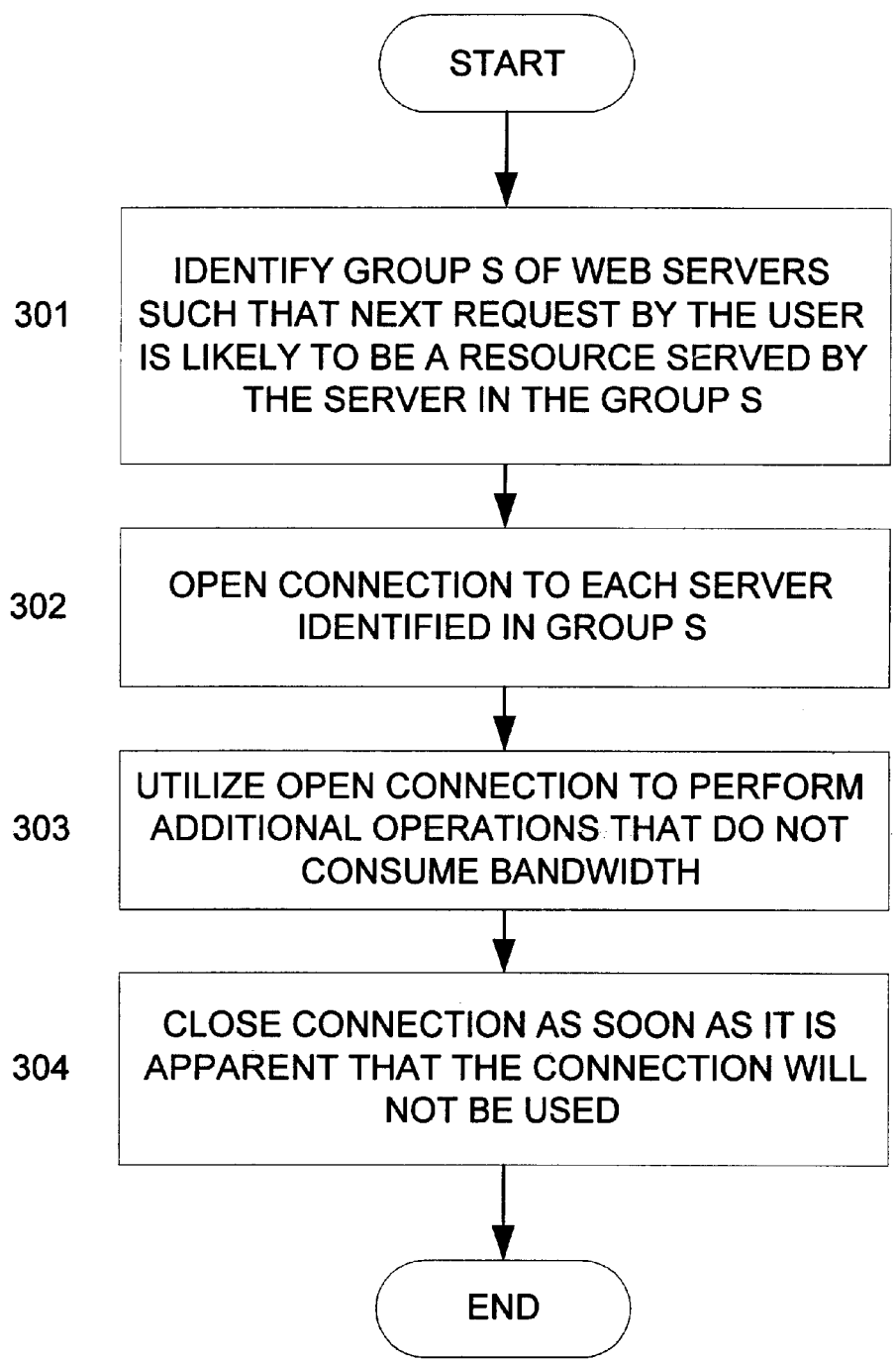
FIG. 3 is a flowchart illustrating a preferred embodiment of the invention.

First, a group S of Web servers is identified such that the next request by the user is likely to be a resource served by the server in the group S. See step 301 of FIG. 3. This can be accomplished by extracting hyper-links from the current Web page the user is browsing. The HREF links on the current page can be analyzed to create a list of likely servers the user will choose next. More sophisticated techniques may also be used involving studies of the user's browsing patterns or an analysis of the user's bookmarks file. The various techniques at predicting future user accesses that are contemplated for use with document prefetching can be translated for use with connection prefetching.

Second, a connection is opened to each server identified in the group S. See step 302 in FIG. 3. HTTP can specify to open the connection utilizing a feature built into HTTP 1.1 called persistent TCP connections, described above. The connection can also simply be kept open under HTTP 1.0. When the user requests a resource served by a server which is a member of the group S, within a short time period, there is an appreciable reduction in user-perceived latency. The request has been issued on an already-established TCP connection, therefore, reducing latency.

In contrast to the prefetching of documents, preconnecting does not hog network bandwidth or consume cache space, and hence can be used with much less scrutiny. Due to the high overhead required, document prefetching can only be used to servers with a significant probability of being accessed, e.g. 50%. On the other hand, preconnecting can be performed with a much larger group of servers that are much less likely to be contacted. Preconnecting consumes significantly less resources, and hence, can be employed even to servers where there is a low likelihood of future access by the user. Moreover, the cost of preconnecting can be further reduced by closing the connection as soon as it is apparent that the connection will not be used, rather than waiting for a default timeout by the server. For example, when the user issues a request and is presently looking at a different web page, and where none of the hyperlinks on the new page utilize the prefetched connection, the connection can be closed since it is obvious that the connection is not going to be utilized by the user anytime soon. See step 304 in FIG. 3.

The open connection can also be utilized to perform additional operations that do not consume a lot of bandwidth and can save on the user perceived latency that these operations normally incur. See step 303 in FIG. 3. For example, the open connection can be used to validate cached resources. Web browsers or proxy servers often maintain a cache of previously requested documents. When a cached resource is requested, it is served from the local cache and not requested again from the server, thus reducing latency. Before a cached resource is served, however, there is a need to ensure that the cached resource is not stale, i.e. the resource has not yet been modified by the server. This requires opening a connection to the server and using the connection to send an "if-modify-since" HTTP request. The request essentially queries the server whether the resource has been modified since the date it was cached. The user, thereby, again suffers the connection setup RTT delay and the additional delay due to the round of the "if-modify-since" request and response. When a connection is prefetched to a server providing a cached resource that has a probability of being requested soon, the prefetched TCP connection can be utilized to validate the cached resource before an actual request for the resource arrives. If the cached copy is indeed still valid, the latency from the delay from opening the connection—as well as the latency due to the second communication round—can be eliminated. Accordingly, if the cached copy is stale, the resource is not requested until the user actually requests the resource.

Likewise, the prefetched connection can be used to request header information of a resource to ascertain its size, estimate the network speed, or obtain some other meta attribute of the resource or connection that can be utilized by an intelligent agent, such as Web Browser Intelligence (WBI), to improve service. The prefetched connection can be used to follow an HTTP redirect, thus eliminating the second roundtrip time required when the current web page points to another web page. A connection can also be prefetched to a Domain Name Service (DNS) server in order to prefetch a name-to-address translation for the server, without following up with a connection to the server. DNS servers translate the name of a Web site such as "www.at-t.com" into the numeric IP address of the desired server, which must be specified before a TCP connection to the server can be established. In some circumstances, it may be advantageous to prefetch the name-to-address translation without preconnecting to the server. For example, when certain servers suffer from excessive preconnecting, DNS prefetching can be used to minimize the connections established to that server.

The technique of preconnecting is particularly useful when browsing search engines and catalogues such as Alta Vista™ or Yahoo!™, where any given page can reference a group of several different servers. The technique can be implemented as part of either the browser or the proxy cache code. The technique has the advantage that it does not require a modification of the protocol or any changes to a Web servers' code. It does not require wide use to be beneficial to the user and potentially has even greater benefits in speed as soon as HTTP 1.1 is deployed by most popular search engines. Moreover, the above technique is complementary to most of the other techniques described in the background for reducing user perceived latency.

Variations and modifications to the above-described preferred embodiment will be apparent to one skilled in the art that are within the spirit and scope of the invention as set forth in the claims below.

What is claimed is:

1. A computer relable medium containing executable program instructions for performing a method on a computer connected to a network comprising the steps of:
   identifying a server with a probability of being accessed;
   establishing an open connection to said server;
   waiting for a user request to use said connection; and
   utilizing the open connection after a user request to use said connection is received.

2. The computer readable medium of claim 1 wherein said connection is established to provide access to a resource on said server.

3. The computer readable medium of claim 2 further comprising the step of:
   retrieving information regarding said resource without retrieving said resource.

4. The computer readable medium of claim 2 further comprising the step of:
   where said resource on said server has been cached, validating said cached resource.

5. The computer readable medium of claim 1 wherein said server is a World Wide Web server.

6. The computer readable medium of claim 5 wherein the step of identifying a server further comprises the steps of:
   analyzing a World Wide Web page currently being viewed by a user for a link to a server; and
   identifying a server referenced in said link on said World Wide Web page.

7. The computer readable medium of claim 1 wherein said connection is a TCP connection.

8. The computer readable medium of claim 1 further comprising the step of:
   where said server is redirected to a second server, establishing an open connection to said second server prior to a request to use said connection to said second server.

9. The computer readable medium of claim 1 wherein said server is a DNS server and wherein said connection is established to provide an address of a second server with a probability of being accessed.

10. The computer readable medium of claim 1 further comprising the step of:
   closing the open connection if a user request to use said connection is not received.

11. The method of claim 1 further comprising the step of:
   closing the open connection if a user request to use said connection is not received.

12. A method of reducing delay in connecting to a server comprising the step of:
   identifying a server with probability of being accessed;
   establishing an open connection to said server;
   waiting for a user request to use said connection; and
   utilizing the open connection after a user request to use said connection is recieved.

13. The method of claim 12 wherein said server is a World Wide Web server.

14. The method of claim 13 wherein the step of identifying a server further comprises the steps of:
   analyzing a World Wide Web page currently being viewed by a user for a link to a server; and
   identifying a server referenced in said link on said World Wide Web page.

15. The method of claim 12 further comprising the step of:
   where said server is redirected to a second server, establishing an open connection to said second server prior to a request to use said connection to said second server.

16. The method of claim 15 further comprising the step of:
   where said resource on said server has been cached, validating said cached resource.

17. The method of claim 12 wherein said connection is established to provide access to a resource on said server.

18. The method of claim 17 further comprising the step of:
   retrieving information regarding said resource without retrieving said resource.

19. The method of claim 12 wherein said connection is a TCP connection.

20. The method of claim 12 wherein said server is a DNS server and wherein said connection is established to provide an address of a second server with a probability of being accessed.

* * * * *